Dec. 25, 1951 H. W. ROLLMAN ET AL 2,580,245
FOOTWEAR WITH SPONGE RUBBER SOLE
AND RUBBER UPPER-ATTACHING STRIP
Filed Oct. 20, 1947

INVENTORS
HEINZ W. ROLLMAN
AND ANDREW SZERENYI
BY
ATTORNEY

Patented Dec. 25, 1951

2,580,245

UNITED STATES PATENT OFFICE 2,580,245

FOOTWEAR WITH SPONGE RUBBER SOLE AND RUBBER UPPER-ATTACHING STRIP

Heinz W. Rollman and Andrew Szerenyi, Waynesville, N. C., assignors to Ro-Search, Inc., Waynesville, N. C., a corporation of North Carolina Application October 20, 1947, Serial No. 780,992
In Belgium March 4, 1940

Section 1, Public Law 690, August 8, 1946
Patent expires March 4, 1960

1 Claim. (Cl. 36—14)

This invention refers to footwear of the type having an upper of material other than rubber, such as woolen or cotton fabric and a sole containing sponge rubber.

Hitherto footwear of this type has often a sponge rubber sole formed and simultaneously vulcanized in a closed mold onto the upper. The sponge rubber penetrates into the upper under the pressure developed in the closed mold, provided that the upper is of appropriate open structure. Then a permanent and secure bond is assured.

One object of the invention is to provide footwear of the type described which has a permanent and secure bond between the upper and the sponge rubber even if the material of the upper is of a structure not easily connected to the sponge rubber during the latter's formation.

Other objects of the invention are shown in connection with the description and the drawings, of which Fig. 1 shows in a diagram a cross section of a shoe according to the invention with a sole of sponge rubber covered on its bottom with a solid rubber treadsole.

Fig. 3 shows an upper as used for the shoe shown in Fig. 1 or 2, this upper being in the flat stage with the rubber strip pressed on.

Figure 1:
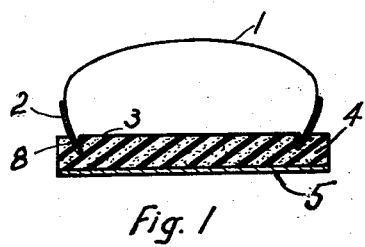

The shoe according to the invention has an upper 1, as shown in Fig. 1, which may consist of fabric or leather or any other material, other than rubber, appropriate for uppers of footwear. The shape of the upper depends upon the proposed use of the footwear, such as street shoe, slipper, sport shoe, sandal etc., and no detail of this upper is shown as it is not relevant for the realization of the invention. The sole is composed of a layer 4 of sponge rubber and a treadsole 5 of solid rubber. The thickness of either one of these layers may be altered according to the proposed use of the footwear, for instance a solid rubber sole of $\frac{1}{16}''$ and a layer of $\frac{1}{8}''$ of sponge may be foreseen.

According to the invention a strip 2 of solid rubber is applied to the margin of the upper where the upper is in contact with the sponge rubber of the sole. This strip of rubber may extend on the side of the upper for ornamental purposes or to protect the upper against wear. This strip may be continuous or may only extend over those locations where an improved bond is needed between upper and sponge rubber of the sole. It is essential that this strip of solid rubber reaches towards the inside of the sole to offer a connecting surface to the sponge rubber.

Figure 5:
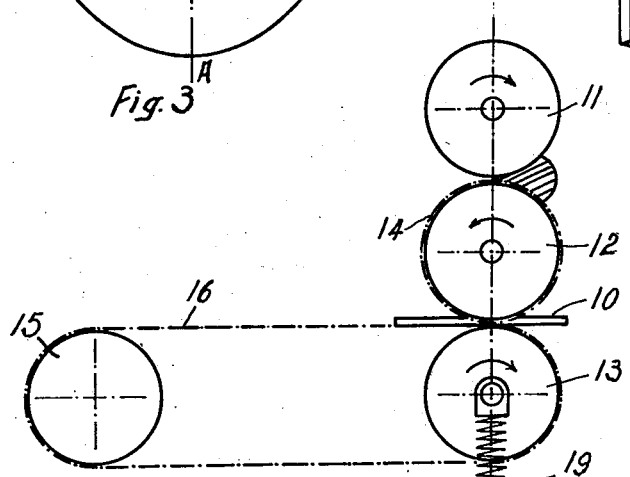
Fig. 5 shows the diagram of the calender arrangement used to press the rubber into the mold or the fabric onto the rubber.

To secure a secure bond between the material of the upper and the strip of solid rubber the two materials are pressed together according to the invention in the following manner: The rubber mixture, usually unvulcanized and of the highly plasticised type is pressed into molds 10, as shown in Fig. 5, in a calender comprising a top roll 11, a middle roll 12 and a bottom roll 13. A bank of rubber is maintained in the usual way on one side between the rolls 11 and 12 so that a uniform sheet of rubber 14 is formed and travels towards the bottom roll 13, which is suspended on springs 19. Over this bottom roll 13 and an idler 15 runs an endless belt 16 on which the operator places the molds 10 provided with recesses 17 according to the desired shape and thickness or ornamentation of the rubber strip 2. During the travel of the molds through the gap between the middle and the bottom roll rubber mix is forced into the molds by pressure and friction. This friction, caused by the difference in surface speed between the middle roll and the mold or the belt 16, is essential to eliminate the trapping of air in the mold and to avoid excessive pressure, otherwise necessary to assure complete filling of the molds. The pressure can be adjusted through the springs 19 and the friction can be adjusted by varying the surface speed of the belt 16.

Figure 3:
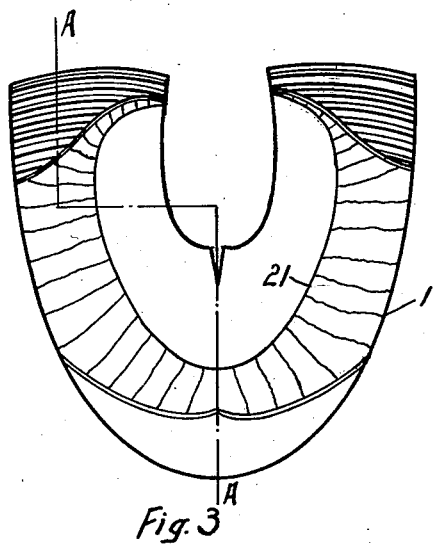
Figure 4:
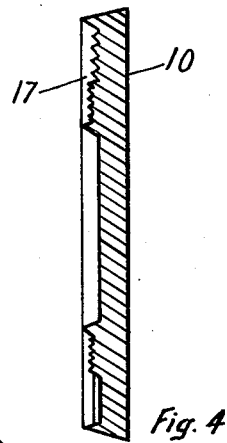
Fig. 4 shows in cross section the mold used to press the rubber onto the flat upper, taken along the line A—A shown in Fig. 3.

After the molds 10 are filled with rubber mix the uppers 1, which may be die-cut in the usual manner, are placed on top of the rubber. The outside contour of the mold will usually correspond to the outside, that is, the bottom line of the flat upper, as shown in Fig. 3. The recess 17 will end towards the inside of the upper, to correspond with the desired rubber coating, along a line 21. The uppers are then pressed against the rubber filled molds under friction. This friction is again obtained by passing the molds between the middle roll and the bottom roll of a calender as shown in Fig. 5, but now the rubber sheet 14 is omitted. The molds are placed on the belt 16 with the uppers covering the rubber towards the uncoated middle roll 12. The pressure and the friction caused by the different surface speed of roll and mold respectively unites the rubber and the material of the upper. The pressure which occurs only along the line of contact between roll and mold and the friction which cannot be obtained in platen presses commonly used in the shoe industry assure the permanent close bond between the rubber strip and the upper even if the material of the upper is very smooth such as glazed leather or has a surface coating such as strongly sized cotton fabric or mohair fabric.

It is essential according to the invention that the vulcanization of the rubber strip 2 takes place simultaneously with the formation and vulcanization of the sponge rubber and in contact with the latter. The two rubber compounds flow then together where they are in contact and the homogeneous bond so created is visible by examination of the completed footwear.

The term rubber is used here not only for compounds based on extracts of the hevea plant but for all natural or synthetic elastomers in solid form or latex, prior to curing.

The upper may be stitched together with a socklining 3 by a seam 8, as shown in Fig. 1, or may extend without socklining in to the sole. The improved bond between upper and sole according to the invention is usually reached if at least about $\frac{1}{16}''$ of the solid rubber strip is in contact with the sponge rubber. Therefore the edge of the upper, if so desired, may be left free and not covered with solid rubber as long as enough area of the solid rubber strip is in contact with the sponge rubber.

Figure 2:
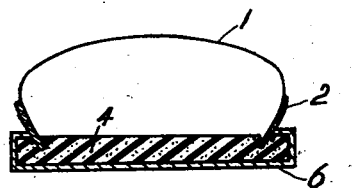
Fig. 2 shows a similar cross section of a shoe according to another realization of the invention.

The solid rubber strip on the margin of the upper extending inwards to contact the sponge rubber in the sole may be used also to great advantage for footwear where not only the bottom of the sole but also the sides and the upper rim of the sole are formed of solid rubber, as shown in Fig. 2. Here the bottom 6 of the solid rubber sole extends over the side and the upper rim so that the sponge rubber layer 4 is not visible from the outside. The solid rubber strip 2 passes the upper rim and extends inwards to contact the sponge rubber.

What we claim is:

Footwear having an upper of fibrous material and a sole containing sponge rubber, a layer of solid rubber pressed into the margin of said upper, said layer forming a fused bond between said upper and said sponge rubber and being vulcanized in situ to said upper and sole.

HEINZ WALTER ROLLMAN.
ANDREW SZERENYI.

REFERENCES CITED

The following references are of record in the file of this patent:

UNITED STATES PATENTS

| Number | Name | Date |
|---|---|---|
| 1,215,449 | White | Feb. 13, 1917 |
| 1,579,650 | Cutler | Apr. 6, 1926 |
| 1,622,860 | Cutler | Mar. 29, 1927 |
| 1,952,628 | MacDonald | Mar. 27, 1934 |
| 2,129,106 | Szerenyi | Sept. 6, 1938 |
| 2,210,753 | Field | Aug. 6, 1940 |
| 2,437,030 | Hoza | Mar. 2, 1948 |

FOREIGN PATENTS

| Number | Country | Date |
|---|---|---|
| 371,779 | Italy | June 2, 1939 |